United States Patent
Chien et al.

(10) Patent No.: US 8,913,857 B2
(45) Date of Patent: Dec. 16, 2014

(54) OPTICAL BACKPLANE ASSEMBLY

(75) Inventors: Chih-Ming Chien, New Taipei (TW); Feng Pan, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 182 days.

(21) Appl. No.: 13/488,334

(22) Filed: Jun. 4, 2012

(65) Prior Publication Data

US 2012/0308188 A1 Dec. 6, 2012

(51) Int. Cl.
*G02B 6/43* (2006.01)
*G02B 6/36* (2006.01)

(52) U.S. Cl.
CPC ............... *G02B 6/43* (2013.01); *G02B 6/3608* (2013.01)
USPC .................................. 385/14; 385/15; 385/32

(58) Field of Classification Search
CPC ..................................................... G02B 6/3608
USPC .......................................................... 385/14
See application file for complete search history.

(56) References Cited

U.S. PATENT DOCUMENTS

| | | | |
|---|---|---|---|
| 6,878,925 B2 * | 4/2005 | Yamada et al. | 250/227.11 |
| 7,068,871 B2 * | 6/2006 | Sugama et al. | 385/14 |
| 7,092,592 B2 | 8/2006 | Verhagen et al. | |
| 7,418,165 B2 | 8/2008 | Glebov et al. | |
| 7,466,924 B2 | 12/2008 | English et al. | |
| 7,680,367 B2 | 3/2010 | Matsuoka et al. | |
| 7,991,248 B2 | 8/2011 | Matsuoka et al. | |
| 2002/0097672 A1 * | 7/2002 | Barbas et al. | 370/216 |
| 2002/0099972 A1 * | 7/2002 | Walsh et al. | 714/10 |
| 2004/0179771 A1 | 9/2004 | Verhagen et al. | |
| 2005/0100340 A1 * | 5/2005 | Nishimura | 398/135 |
| 2009/0003761 A1 | 1/2009 | Matsuoka et al. | |
| 2009/0097803 A1 | 4/2009 | Yeo | |
| 2009/0148116 A1 * | 6/2009 | Yanagimachi et al. | 385/135 |
| 2010/0166363 A1 * | 7/2010 | Matsuoka et al. | 385/14 |
| 2011/0026878 A1 * | 2/2011 | Matsuoka et al. | 385/14 |
| 2012/0308188 A1 * | 12/2012 | Chien et al. | 385/135 |

FOREIGN PATENT DOCUMENTS

CN 1541343 10/2004

* cited by examiner

*Primary Examiner* — Rhonda Peace
(74) *Attorney, Agent, or Firm* — Ming Chieh Chang; Wei Te Chung

(57) ABSTRACT

An optical backplane assembly (1) includes a backplane (10), a first switch card (21), a second switch card (22) disposed on one side of the first switch card, a plurality of first line cards disposed on the other side of the first switch card, and a first optical assembly (41) including a plurality of first optical channels (411) and a plurality of second optical channels (412) overlapped with the first optical channel. The first optical channels optically interconnecting the first switch card with the first line cards. The second optical channels optically interconnecting the second switch card with the first optical channels.

19 Claims, 6 Drawing Sheets

OPTICAL BACKPLANE ASSEMBLY

BACKGROUND OF THE INVENTION

1. Field of the Invention

The present invention relates to an optical backplane assembly, and more particularly to an internal optical interconnection of the optical backplane assembly.

2. Description of Related Arts

U.S. Pat. No. 7,680,367, issued on Mar. 16, 2010 to Matsuoka et al., discloses an optical interconnect comprising a first optical waveguide layer having a plurality of cores, a second optical waveguide layer having a plurality of cores, and a plurality of optical elements optically interconnected via the cores of the first and the second optical waveguides. The cores of the first optical waveguides and the cores of the second optical waveguide are positioned at the same position in a vertical direction. Mirrors are arranged in the cores of the first and the optical waveguides. Thus, a light path of a light beam can be changed 90 degrees by the mirrors. The optical interconnect, or optoelectronic integrated circuit board, can be applied in an optical transmission device including a switch card and several line cards and a backplane supporting the switch card and line cards. The switch card comprises an optical connector, an optical waveguide layer, an optical device array, electric wirings, and an electronic circuit. The backplane comprises fiber arrays for transferring optical signals from the optical connector and wirings for connection between the wirings in the line cards.

U.S. Pat. No. 7,418,165, issued on Aug. 26, 2008 to Glebov et al., discloses a flexible optical waveguide or connector for use in an optical backplane. The flexible optical waveguide or connector comprises a waveguide core, a waveguide cladding, and a plurality of angled sections. The angled sections, preferably angled at 45 degrees, have a metallic or other suitable coating to provide light reflectance. The optical connector comprises a plurality of waveguides on two or more levels providing a plurality of light paths that allow light communication between optical circuit boards. The optical connector can be manufactured separately from the backplane and thereafter mounted on the backplane.

An improved optical backplane assembly is desired to offer advantages over the related art.

SUMMARY OF THE INVENTION

An object of the present invention is to provide an optical backplane assembly having a steady and reliable optical interconnection between the switch cards and the line cards.

To achieve the above-mentioned object, an optical backplane assembly comprises a backplane, a first switch card mounted on the backplane, comprising a plurality of first optical connecting areas arranged in a first column along a first direction; a second switch card mounted on the backplane and disposed on one side of the first switch card, comprising a plurality of second optical connecting areas arranged in a second column along the first direction; a plurality of first line cards mounted on the backplane and disposed on the other side of the first switch card, each of the first line cards comprising a third optical connecting area and a fourth optical connecting area, all of the third optical connecting areas of the first line cards arranged in a first row along a second direction, all of the fourth optical connecting areas of the first line cards arranged in a second row along a third direction; and a first optical assembly mounted on the backplane, comprising a plurality of first optical channels, and a plurality of second optical channels overlapped with the first optical channel, the first optical channels optically interconnecting the first optical connecting areas with the third connecting areas, respectively, the second optical channels optically interconnecting the second optical connecting areas with the fourth connecting area, respectively.

According to the present invention, the first optical connecting areas of the first switch card are optically interconnected with the third optical connecting areas of the first line cards through the first optical channels, and the second optical connecting areas of the second switch card are optically interconnected with the fourth optical connecting areas of the first line cards through the second optical channels. Therefore, each of the first and the second optical channels steady and reliable promulgates corresponding optical signal.

DETAILED DESCRIPTION OF THE PREFERRED EMBODIMENT

Reference will now be made in detail to a preferred embodiment of the present invention.

Figure 1:
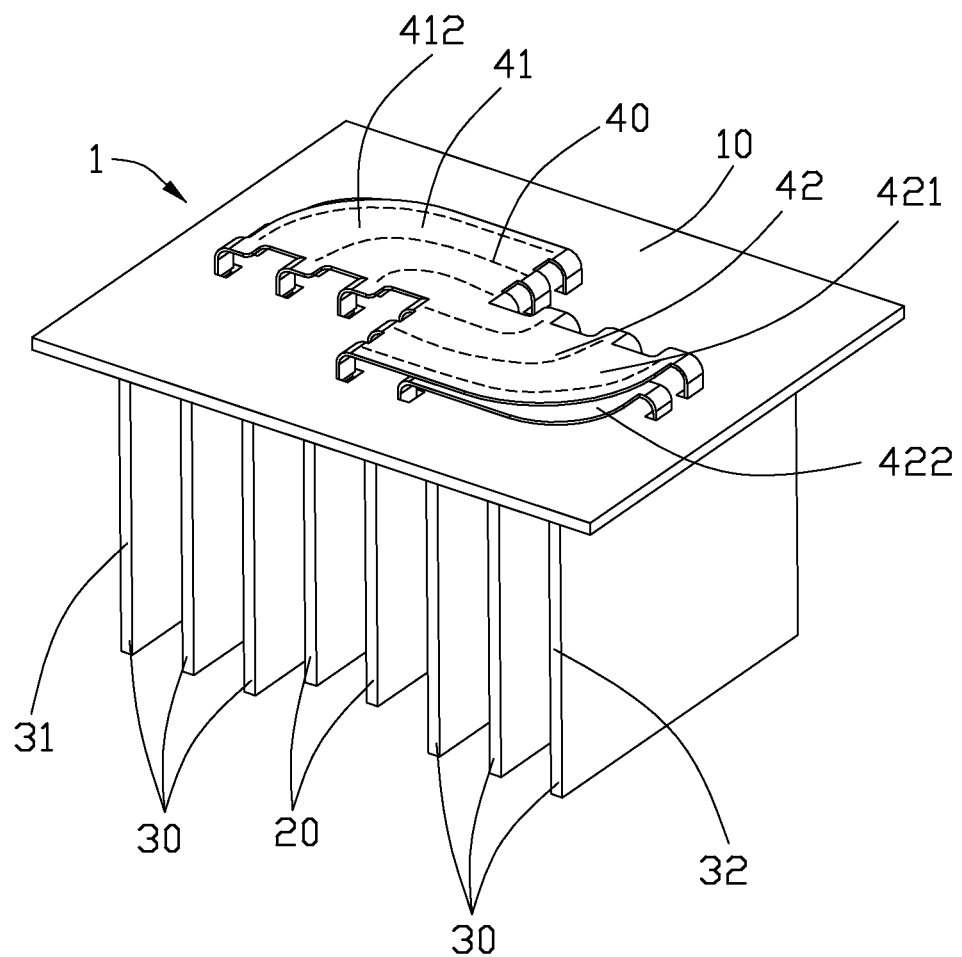
FIG. 1 is a perspective view of an optical backplane assembly in accordance with the present invention.
Figure 2:
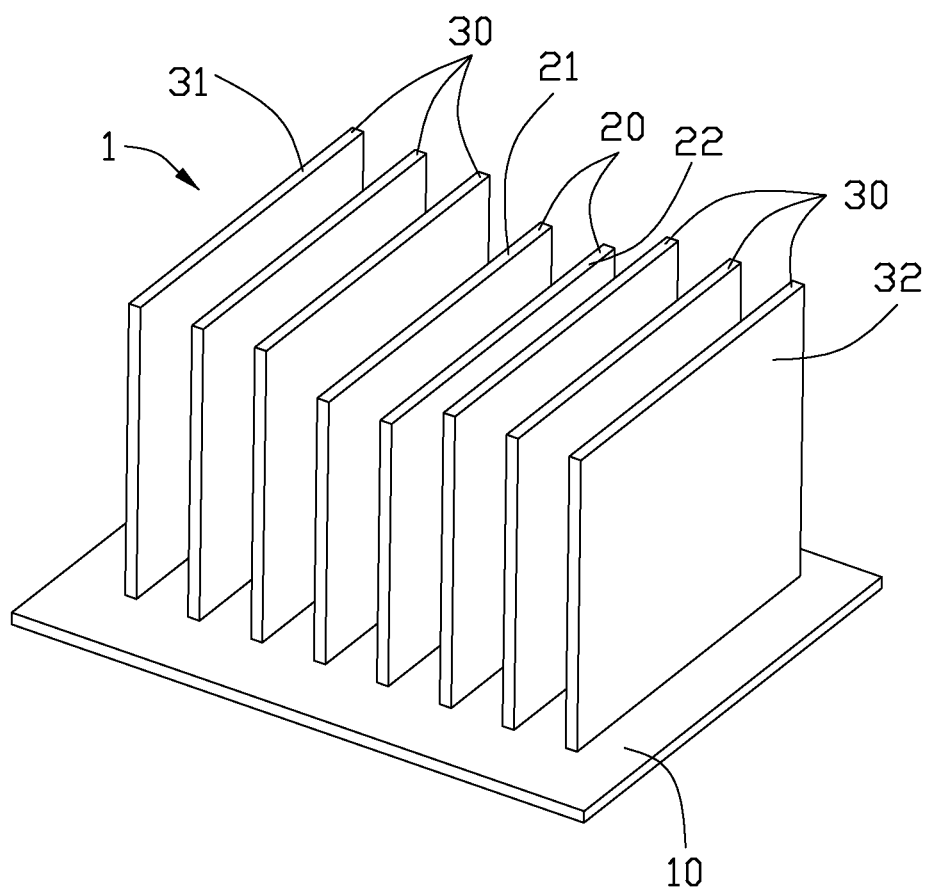
FIG. 2 is another perspective view of the optical backplane assembly as shown in FIG. 1.
Figure 3:
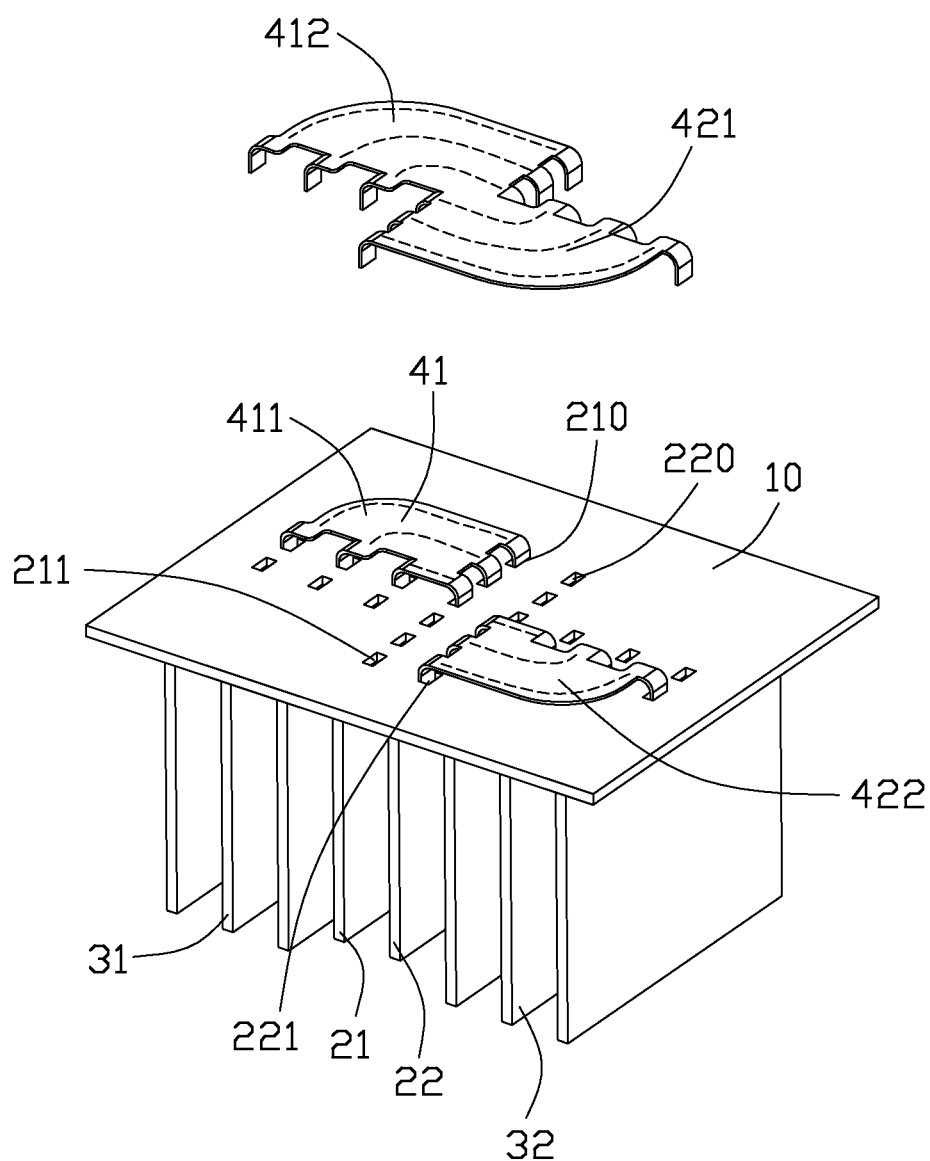
FIG. 3 is a partly exploded view of the optical backplane assembly as shown in FIG. 1.
Figure 4:
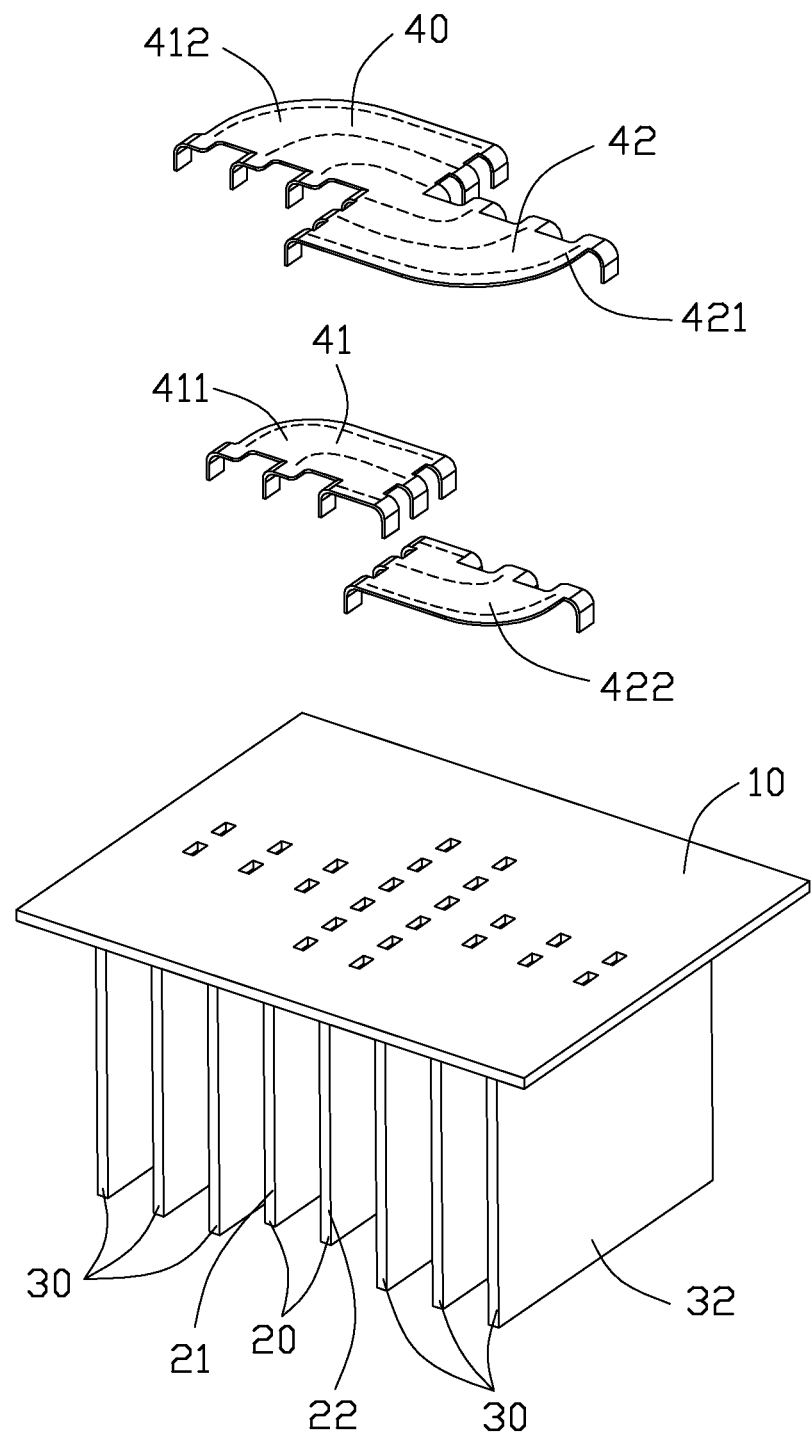
FIG. 4 is a further partly exploded view of the optical backplane assembly as shown in FIG. 1.
Figure 5:
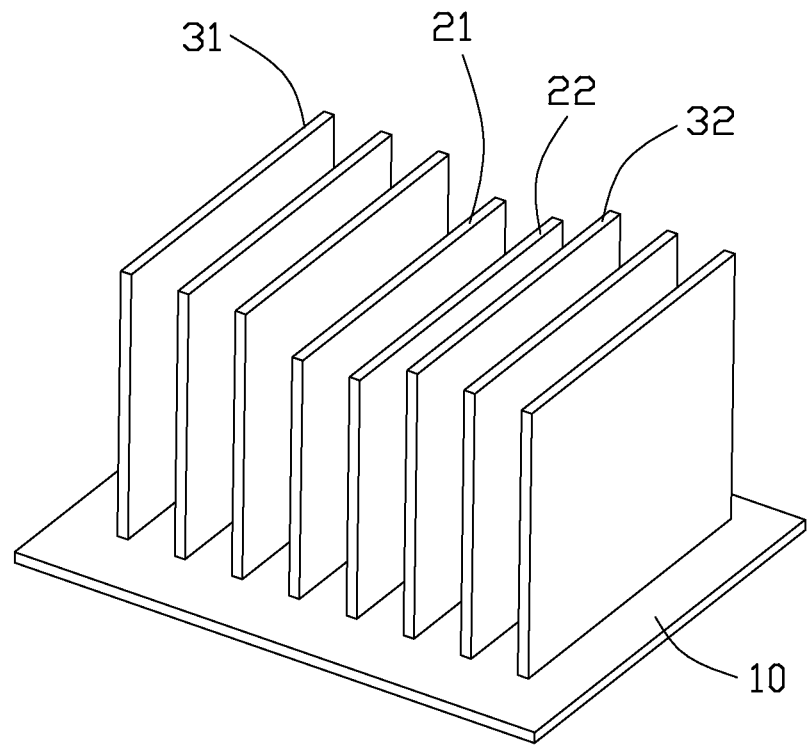
FIG. 5 is another view of the optical backplane assembly as shown in FIG. 4.
Figure 5:
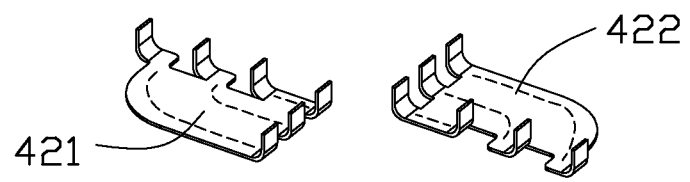
Figure 5:
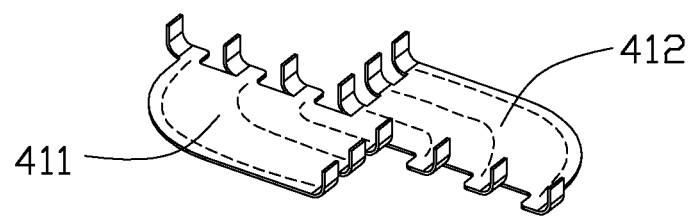
Figure 6:
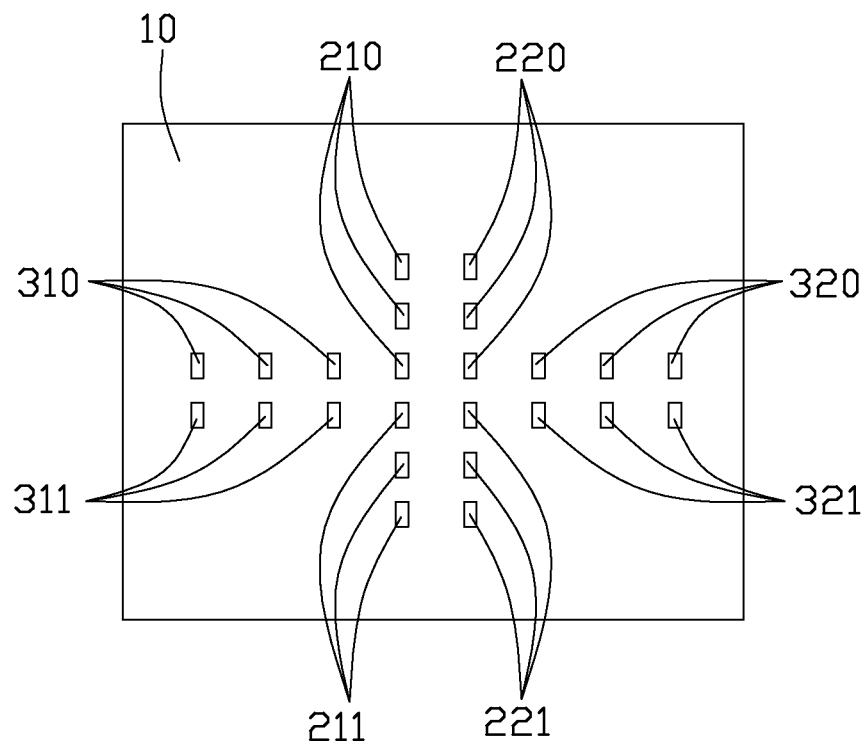
FIG. 6 is a front view of the optical connecting areas of the optical backplane assembly as shown in FIG. 1.

Referring to FIGS. 1 to 6, an optical backplane assembly 1 comprises a backplane 10, a pair of switch cards 20 mounted on a side of the backplane 10, a plurality of line cards 30 mounted on the side of the backplane 10, and an optical assembly 40 mounted on the other side of the backplane 10 for optically interconnecting the line cards 30 with the switch cards 20.

Referring to FIGS. 1 to 6, the pair of switch cards 20 comprises a first switch card 21 and a second switch card 22. The first switch card 21 comprises a plurality of first optical connecting areas 210 arranged in a first column along a first direction, and a plurality of fifth optical connecting areas 211 arranged in the first column along a fourth direction. The first optical connecting areas 210 are aligned with the fifth optical connecting areas 211 in a line. The second switch card 22 comprises a plurality of second optical connecting areas 220 arranged in a second column along the first direction, and a plurality of sixth optical connecting areas 221 arranged in the second column along the fourth direction. The second optical connecting areas 220 are aligned with the sixth optical connecting areas 221 in a line. In this embodiment, the number of the first, the second, the third, and the fourth optical connection areas are three. The fourth direction is opposite to the first direction.

Referring to FIGS. 1 and 3-5, the line cards 30 comprises a plurality of first line cards 31 disposed adjacent to the first switch card 21, and a plurality of second line cards 32 disposed adjacent to the second switch card 22. The switch cards 30 are disposed between the first line cards 21 and the second line cards 22. The first switch card 21, the second switch card 22, the first line cards 31, and the second line cards 32 are arranged parallel to and separated apart from each other. Each of the first line cards 31 comprises a third optical connecting area 310, and a fourth optical connecting area 311 separated apart from the third optical connecting area 310 along the fourth direction. All of the third optical connecting areas 310 of the first line card 31 are arranged in a first row along a second direction. All of the fourth optical connecting areas 311 of the first line card 31 are arranged in a second row along a third direction. Each of the second line cards 32 comprises a seventh optical connecting area 320, and an eighth optical connecting area 321 separated apart from the seventh optical connecting area 320 along the fourth direction. All of the seventh optical connecting areas 320 of the second line cards are arranged in a third row along a fifth direction. All of the eighth optical connecting areas 321 of the second line cards 32 are arranged in a fourth row along a sixth direction. In this embodiment, the number of the first line cards 31 and the second line cards 32 are three. The second direction is perpendicular to the first direction. The third direction is parallel to the second direction. The fifth direction is opposite to the second direction. The sixth direction is parallel to the fifth direction. A distance between a third optical connecting area 310 of one line card 31 and a first optical connecting area 210 is shorter than a distance between a fourth optical connecting area 311 of the line card 31 and the first optical connecting area 210. A distance between an eight optical connecting area 321 of one second line card 32 and a sixth optical connecting area 221 is shorter than a distance between a seventh optical connecting area 320 of the second line card 32 and the sixth optical connecting area 221. The first to the eight optical connecting areas may be formed by optical connectors or other suitable optical members.

Referring to FIGS. 1 and 3-5, the optical assembly 40 comprising a first optical assembly 41 optically interconnecting the first and second switch cards 21, 22 with the first line cards 31, respectively, and a second optical assembly 42 optically interconnecting the first and second switch cards 21, 22 with the second line cards 32. The first optical assembly 41 comprises a plurality of individual first optical channel 411 and a plurality of individual second optical channel 412 overlapped with the first optical channel 411. The first optical channels 411 optically interconnect the first optical connecting areas 210 with the third connecting areas 310, respectively. The second optical channels 412 optically interconnect the second optical connecting areas 220 with the fourth connecting areas 311, respectively. The first and the second optical channels 411, 412 are formed by polymer waveguide. The first optical channels 411 are fully covered by the second optical channels 412. Therefore, the optical signal paths could not be crossed with each other. The second optical assembly 42 comprises a plurality of third optical channels 421 and a plurality of fourth optical channels 422 overlapped with the third optical channels 421. The third optical channels 421 optically interconnect the sixth optical connecting areas 221 with the eighth connecting areas 321, respectively. The fourth optical channels 422 optically interconnect the fifth optical connecting areas 211 with the seventh connecting areas 320, respectively. The third optical channels 421 are fully covered by the fourth optical channels 422. Therefore, the optical signal paths could not be crossed with each other. In this embodiment, the optical assembly 40 is formed by a polymer waveguide. The first optical assembly 41 is centrosymmetric with the second optical assembly 42. The first and the third optical channels 411, 421 are substantially arranged in a flat plane, and the second and the fourth optical channels 412, 422 are substantially arranged in another flat plane. The second optical channels 421 are integrated with the third optical channels. The optical assembly 40 may comprise a plurality of mating optical connectors or other suitable optical members optically connecting with the optical channels 411, 412, 421, 422 for mating with the optical connectors or optical members to build optical connection paths.

All of the optical connection path between the switch cards 20 and the line cards 30 could not be crossed with each other. Therefore, the optical communication is steadily and reliably. Understandably, the number of the line cards and that of the switch cards are not limited to those disclosed in the embodiment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical backplane assembly comprising:
a backplane;
a first switch card mounted on the backplane and comprising a plurality of first optical connecting areas arranged in a first column along a first direction;
at least a second switch card mounted on the backplane and disposed on one side of the first switch card, the second switch comprising a plurality of second optical connecting areas arranged in a second column along the first direction;
a plurality of first line cards mounted on the backplane and disposed on the other side of the first switch card, each of the first line cards comprising a third optical connecting area and a fourth optical connecting area, all of the third optical connecting areas of the first line cards arranged in a first row along a second direction, all of the fourth optical connecting areas of the first line cards arranged in a second row along a third direction; and
a first optical assembly mounted on the backplane, the first optical assembly comprising a plurality of first optical channels and a plurality of second optical channels overlapped with the first optical channels, the first optical channels optically interconnecting the first optical connecting areas with the third optical connecting areas, respectively, the second optical channels optically interconnecting the second optical connecting areas with the fourth optical connecting areas, respectively.

2. The optical backplane assembly as recited in claim 1, wherein the first and the second optical channels are formed by polymer waveguide, the first optical channels being fully covered by the second optical channels.

3. The optical backplane assembly as recited in claim 1, further comprising a plurality of second line cards mounted on the backplane and disposed adjacent to the second switch card, and a second optical assembly optically interconnecting the second line cards with the first and the second switch cards, respectively.

4. The optical backplane assembly as recited in claim 3, wherein the first switch card comprises a plurality of fifth optical connecting areas arranged in the first column along a fourth direction opposite to the first direction; the second switch card comprises a plurality of sixth optical connecting areas arranged in the second column along the fourth direction; each of the second line cards comprises a seventh optical connecting area and an eighth optical connecting area, all of the seventh optical connecting areas arranged in a third row along a fifth direction, all of the eighth optical connecting areas arranged in a fourth row along a sixth direction; the second optical assembly comprises a plurality of third optical channels, and a plurality of fourth optical channels overlapped with the third optical channel, the third optical channels optically interconnecting the sixth optical connecting areas with the eight connecting areas, respectively, the fourth optical channels optically interconnecting the fifth optical connecting areas with the seventh optical connecting areas, respectively.

5. The optical backplane assembly as recited in claim 4, wherein the third and the fourth optical channels are formed by polymer waveguide, the third optical channels being fully covered by the fourth optical channels.

6. The optical backplane assembly as recited in claim 4, wherein the first switch card, the second switch card, the first line cards, and the second line cards are arranged parallel to and separated apart from each other.

7. The optical backplane assembly as recited in claim 4, wherein the first optical assembly is centrosymmetric with the second optical assembly.

8. The optical backplane assembly as recited in claim 4, wherein the first switch card, the second switch card, the first line cards and the second line cards are mounted on one side of the backplane, and the first optical assembly and the second optical assembly are mounted on the other side of the backplane.

9. The optical backplane assembly as recited in claim 4 wherein the second optical channels are integrated with the third optical channels.

10. The optical backplane assembly as recited in claim 4, wherein the fourth direction is opposite to the first direction.

11. The optical backplane assembly as recited in claim 4, wherein the sixth direction is parallel to the fifth direction.

12. The optical backplane assembly as recited in claim 11, wherein the sixth direction is opposite to the fourth direction.

13. The optical backplane assembly as recited in claim 4, wherein the third row of the fifth optical connecting areas are aligned with the first row of the third optical connecting areas in a line, and the fourth row of the fourth optical connecting areas are aligned with the second row of the fourth optical connecting areas in a line.

14. The optical backplane assembly as recited in claim 4, wherein the first and the third optical channels are substantially arranged in a flat plane, and the second and the fourth optical channels are substantially arranged in another flat plane.

15. The optical backplane assembly as recited in claim 1, wherein the first direction is perpendicular to the second direction, and the third direction is parallel to the second direction.

16. An optical backplane assembly comprising:
a backplane defining opposite first and second surfaces thereon;
a plurality of line cards each extending along a first direction while commonly arranged, on said first surface, in parallel with one another in a second direction perpendicular to said first direction;
at least first and second switch cards each extending along the first direction while commonly arranged, on said first surface, in parallel with one another in the second direction, and located beside said plurality of line cards in said second direction;
a plurality of first optical channels respectively connecting the line cards and the first switch card in roughly side-by-side manner with equal intervals; and
a plurality of second optical channels respectively connecting the line cards and the second switch card in roughly side-by-side manner with equal intervals; wherein
the first optical channels and the second optical channels are located at different levels spaced from the second surface;
wherein said first optical channels and said second optical channels curvedly extend;
wherein the second optical channels are longer than the first optical channels, and the first optical channels are closer to the backplane than the second optical channels under condition that the second switch card is farther from the plurality of line cards than the first switch card is.

17. The optical backplane assembly as claimed in claim 16, further including another set of line cards arranged on the other side of the first and second switch cards opposite to said plurality of line cards in the second direction, wherein a plurality of third optical channels and fourth optical channels connect said another set of line cards with the first switch card and with the second switch card, respectively, in a roughly side-by-side manner with equal intervals.

18. The optical backplane assembly as claimed in claim 17, wherein the associated first and second optical channels are essentially symmetrically arranged with regard to the associated third and fourth optical channels in a third direction oblique to the second direction.

19. An optical backplane assembly comprising:
a backplane defining opposite first and second surfaces thereon;
a plurality of line cards each extending along a first direction while commonly arranged, on said first surface, in parallel with one another in a second direction perpendicular to said first direction;
at least first and second switch cards each extending along the first direction while commonly arranged, on said first surface, in parallel with one another in the second direction, and located beside said plurality of line cards in said second direction;
a plurality of first optical channels respectively connecting the line cards and the first switch card in roughly side-by-side manner with equal intervals; and
a plurality of second optical channels respectively connecting the line cards and the second switch card in roughly side-by-side manner with equal intervals; wherein
the first optical channels and the second optical channels are located at different levels spaced from the second surface;
further including another set of line cards arranged on the other side of the first and second switch cards opposite to said plurality of line cards in the second direction, wherein a plurality of third optical channels and fourth optical channels connect said another set of line cards with the first switch card and with the second switch card, respectively, in a roughly side-by-side manner with equal intervals;
wherein the associated first and second optical channels are essentially symmetrically arranged with regard to the associated third and fourth optical channels in a third direction oblique to the second direction.

* * * * *